United States Patent
Witt et al.

(10) Patent No.: US 11,168,173 B2
(45) Date of Patent: Nov. 9, 2021

(54) POLYMERIZABLE COMPOSITION

(71) Applicant: LANXESS DEUTSCHLAND GMBH, Cologne (DE)

(72) Inventors: Michael Witt, Eckersdorf (DE); Joachim Morick, Leverkusen (DE); Dieter Gittel, Leverkusen (DE)

(73) Assignee: LANXESS Deutschland GmbH, Cologne (DE)

(*) Notice: Subject to any disclaimer, the term of this patent is extended or adjusted under 35 U.S.C. 154(b) by 0 days.

(21) Appl. No.: 16/070,433

(22) PCT Filed: Jan. 16, 2017

(86) PCT No.: PCT/EP2017/050780
§ 371 (c)(1),
(2) Date: Jul. 16, 2018

(87) PCT Pub. No.: WO2017/125342
PCT Pub. Date: Jul. 27, 2017

(65) Prior Publication Data
US 2019/0016846 A1    Jan. 17, 2019

(51) Int. Cl.
| | | |
|---|---|---|
| *C08G 63/91* | (2006.01) | |
| *C08G 18/38* | (2006.01) | |
| *C08G 69/18* | (2006.01) | |
| *C08G 18/22* | (2006.01) | |
| *C08G 18/80* | (2006.01) | |
| *C08J 5/24* | (2006.01) | |

(52) U.S. Cl.
CPC ....... *C08G 18/3844* (2013.01); *C08G 18/225* (2013.01); *C08G 18/8074* (2013.01); *C08G 69/18* (2013.01); *C08J 5/24* (2013.01); *C08J 2375/12* (2013.01)

(58) Field of Classification Search
CPC .. C08G 62/91; C08G 18/225; C08G 18/3844; C08G 18/8074; C08J 5/24; C08J 2375/12
USPC ...................................................... 524/879
See application file for complete search history.

(56) References Cited

U.S. PATENT DOCUMENTS

| 4,939,234 A | 7/1990 | Tonti et al. |
| 8,354,492 B2 | 1/2013 | Kray et al. |
| 2011/0288258 A1 | 11/2011 | Desbois et al. |
| 2012/0088899 A1* | 4/2012 | Scherzer ............... C08G 69/14 528/325 |
| 2013/0261282 A1* | 10/2013 | Biedasek .............. C08G 69/00 528/315 |
| 2014/0142274 A1* | 5/2014 | Desbois ................ C08G 69/18 528/315 |
| 2014/0154937 A1* | 6/2014 | Desbois .................... C08J 5/24 442/58 |
| 2015/0051368 A1 | 2/2015 | Kugler et al. |

FOREIGN PATENT DOCUMENTS

| CN | 102532524 | 7/2012 |
| DE | 102010040027 B4 | 3/2012 |
| EP | 3130622 | 4/2020 |
| WO | 199802481 A1 | 1/1998 |
| WO | 2012045806 | 4/2012 |
| WO | 2013144132 A1 | 10/2013 |
| WO | 2014086757 | 6/2014 |

OTHER PUBLICATIONS

International Search Report/Written Opinion from corresponding PCT Application No. PCT/EP2017/050780 dated May 5, 2017.
Oatenblatt Addonyl® Kat NL, Technical Data Sheet, LANXESS Deutschland GmbH, Aug. 26, 2016, three pages.
Ahmadi, Shervin, et al. Iranian Polymer Journal, 19(3), 2010, pp. 229-240.
Datasheet Polyamide PA6 (Biegefestigkeit), Koenig GmbH, www.koenig-kunstoffe.de, Jun. 2016.
Presentation by Johns Manville published in the year 2013 (May 15, 2013 Internet Publication), 27 pages.
Technical Information by Lanxess on polyamides (PA6 and PA66), Aug. 17, 2009,15 pages.
European Patent Application No. 17701082.4, as filed on Jan. 16, 2017.
Opposition dated Aug. 14, 2020, against EP3405512 B1 issued Nov. 27, 2019 (European Patent Application No. 17701082.4, filed Jan. 16, 2017), 85 pages.

* cited by examiner

*Primary Examiner* — Jane L Stanley
(74) *Attorney, Agent, or Firm* — Christopher L. McDavid; Nicanor A. Kohncke

(57) ABSTRACT

A polymerizable composition comprising
a) at feast one cyclic amide,
b) from 2.8 to 3.5% by weight, preferably from 2.9 to 3.1% by weight, of at least one blocked polyisocyanate, and
c) from 1.2 to 1.4% by weight of at least one catalyst for the polymerization of the cyclic amide,
where the ratio by weight of components b) to c) is from 2.0 to 2.9 and the % by weight data are always based on the entirety of components a) to c).

13 Claims, No Drawings

POLYMERIZABLE COMPOSITION

The present invention relates to a polymerizable composition comprising a specific activator/catalyst mixture, to a process for production thereof, and also to a process for the production of a fiber-reinforced composite material with use of said polymerizable composition.

It is known that during the production of composite plastics of this type a lactam is usually transferred together with at least one catalyst and at least one activator into a cavity into which the textile reinforcement has previously been inserted.

The fabric here is first saturated by a low-viscosity monomer melt and is then anionically polymerized in the mold together with further monomeric lectern, whereupon the composite plastic component is produced directly or in situ. The term used hereinafter for this type of process is "reaction injection molding" of polyamide 6, abbreviated to RIM PA 6.

The activator is essential in order to reduce the polymerization temperature to such an extent that the polymerization reaction becomes attractive for industrial processes, and that a composite product can be removed from the mold within a few minutes.

The plastics matrix of RIM PA 6 composite plastics corresponds to traditional "Cast PA 6"; in this connection, see also P. Wagner, Kunststoffe 73, 10 (1983), pp. 588-590.

Activators used for anionic caprolactam polymerization reaction are preferably isocyanates and acyl halides, in particular caprolactam-blocked isocyanates.

These blocked isocyanates have a characteristic unblocking temperature dependent on chemical architecture. An example of an activator permitting short cycle times is a caprolactam-blocked hexamethylene diisocyanate.

In the unblocked condition, the isocyanate group, which is then free, has the potential to react with polar groups, in particular hydroxy groups, located on the fiber surface or on the size.

The quality of the bond between fiber and matrix is important for achieving good mechanical properties in fiber composite materials. For this reason, reinforcement fibers are mostly pretreated with what is known as an adhesion promoting size in order to improve the meagre chemical similarity between fibers and surrounding matrix.

The sizes applied therefore provide bonding to the actual matrix.

The number of different adhesion promoters available is known to be large, and it is necessary here to select a suitable promoter or a suitable mixture of adhesion promoters as required by the matrix material and fiber material in the case of the anionic caprolactam polymerization reaction for the production of composite plastics, a distinction is drawn in principle between two types of size:

Compatible Size:

This type of size is compatible with the anionic polymerization reaction, and affects the polymerization reaction, although not significantly.

Reactive Size:

Reactive size generally comprises chemical groups on the fiber surface which are active and therefore intervene in the course of the polymerization reaction. In the ideal case, the polymer chains grow outward from the fiber surface. Sizes of this type are described by way of example in DE102010040027B4.

Application of reactive sizes always requires a complicated process which leads to a significant increase in the cost of the textile reinforcement. It is disadvantageous that in order to achieve good results the polymerization formulation has to be adapted appropriately for the nature and quantity of the fiber material treated with reactive size.

The production of fiber composite materials has already been disclosed in numerous publications, but, if fiber composite materials with acceptable properties are to be obtained, this mostly requires an inconvenient process and/or starting materials or mixtures that are complicated to produce: WO2012/045806 and WO2014/086757 describe a process where respectively a monomer mixture of lectern, activator and catalyst must first be produced by a complicated method in a melt process in order then to be reacted in a subsequent step with a fiber material to give a fiber composite material with good residual monomer content and good properties.

Object:

Without use of fibers modified with "reactive size", the bond between fibers and matrix has hitherto, not been ideal; this conclusion can be reached by way of example on the basis of flexural strengths of the composite materials.

There therefore continues to be a requirement for a method for the production of a fiber-reinforced composite material which avoids the disadvantages of the processes known from the prior art and which can, in a relatively simple manner, provide good fiber composite materials with low residual monomer contents.

At the same time, without use of fibers modified with "reactive size", the bond between fibers and matrix has hitherto not been ideal; this conclusion can be reached by way of example on the basis of flexural strengths of the composite materials.

Ways have therefore also been sought for achieving very good bonds between fiber and matrix, and thus very good mechanical properties, even when fibers used have a "compatible size".

Achievement of Object and Subject Matter of the Invention:

Surprisingly, it has now been found that a very good bond between fiber and matrix is obtained, i.e., particularly stable fiber composite materials can be produced, in particular materials with high flexural strength and low residual monomer content, when the following polymerizable composite is used.

The invention provides a polymerizable composition comprising
   a) at least one cyclic amide, preferably from 95.1 to 95% by weight,
   b) from 2.8 to 3.5% by weight, preferably from 2.9 to 3.1% by weight, of at least one blocked polyisocyanate, and
   c) from 1.2 to 1.4% by weight of at least one catalyst for the polymerization of the cyclic amide, where the ratio by weight of components b) to r) is from 2.0 to 2.9, preferably from 2.2 to 2.8 and the % by weight data are always based on the entirety of components a) to c).

Component a)

It is preferable to use, as cyclic amide of component a), an amide of the general formula (I),

where R is a $C_3$-$C_{13}$-alkylene group, in particular a $C_5$-$C_{11}$-alkylene group.

Suitable cyclic amides of component a) are in particular lactams of the formula (I) such as ε-caprolactam, 2-piperidone (δ-valerolactam), 2-pyrrolidone (γ-butyrolactam), enantholactam, laurolactam, or a mixture of these. The cyclic amide of component a) is preferably caprolactam, laurolactam or a mixture of these. It is particularly preferable that lactam used comprises exclusively caprolactam or exclusively laurolactam.

Component b)

The activator of component b) is preferably one of those based on blocked aliphatic polyisocyanates, for example isophorone diisocyanate (IPDI) or in particular those of the formula OCN—$(CH_2)_{4-20}$—NCO, for example butylene diisocyanate, hexamethylene diisocyanate (HDI), octamethylene diisocyanate, decamethylene diisocyanate, undecamethylene diisocyanate or dodecamethylene diisocyanate. Particular preference is given to blocked hexamethylene diisocyanate (HDI).

Lactam-blocked isocanate, in particular caprolactam-blocked polyisocyanate, is preferred as blocking agent for the polyisocyanates of component b). It is also possible in principle here to use variously blocked polyisocyanates in a mixture.

Particular preference is given to caprolactam-blocked HDI, N,N'-hexane-1,6-diylbis(hexahydro-2-oxo-1H-azepine-1-carboxamide), CAS No.: 5888-87-9.

The ratio by mass of the cyclic amide of component a) to the blocked polyisocyanate of component b) can vary widely, and is generally from 1:1 to 10000:1, preferably from 5:1 to 2000:1, particularly preferably from 20:1 to 1000:1.

Component c)

The catalyst c) for the polymerization of the cyclic amide is preferably selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium hydroxide, potassium methanolate, potassium ethanolate, potassium propanolate and potassium butanolate, preferably from the group consisting of sodium hydride, sodium and sodium caprolactamate, particularly preferably being sodium caprolactamate.

The molar ratio of cyclic amide a) to catalyst 0) can vary widely; it is generally from 1:1 to 10000:1, preferably from 5:1 to 1000:1, particularly preferably from 1:1 to 500:1.

The polymerizable composition of the invention preferably comprises from 50 to 100% by weight of components a) to c), preferably from 80 to 100% by weight, based on the total weight of the composition.

The polymerizable composition of the invention can comprise one or more polymers, where the polymer can in principle be selected from polymers which are obtained during polymerization of the polymerizable composition of the invention, polymers different therefrom and polymer blends.

In a suitable embodiment, the polymerizable composition of the invention can also comprise filler. Fillers, in particular particulate fillers, can have a wide range of particle sizes extending from dust-like to coarse-grain particles. Organic or inorganic fillers and/or fibrous materials can be used as filler material. By way of example, it is possible to use inorganic fillers, such as kaolin, chalk, wollastonite, talc powder, calcium carbonate, silicates, titanium dioxide, zinc oxide, graphite, glass particles, e.g. glass spheres, nanoscale fillers, for example carbon nanotubes, carbon black, nanoscale phyllosilicates, nanoscale aluminum oxide ($Al_2O_3$), nanoscale titanium dioxide ($TiO_2$), carbon nanotubes, graphene, phyllosilicates and nanoscale silicon dioxide ($SiO_2$).

It is preferable to use a quantity of from 0 to 90% by weight of fillers, in particular from 0 to 50% by weight, based on the polymerizable composition of the invention.

It is moreover possible to use one or more fibrous materials. These are preferably selected from known inorganic reinforcement fibers, for example boron fibers, glass fibers, carbon fibers, silica fibers, ceramic fibers or basalt fibers; organic reinforcement fibers, for example aramid fibers, polyester fibers, nylon fibers, polyethylene fibers or natural fibers, for example wood fibers, flax fibers, hemp fibers or sisal fibers.

In particular, preference is given to the use of glass fibers, carbon fibers, aramid fibers, boron fibers or metal fibers. The fibers mentioned are preferably used in the form of continuous fibers, for example in the form of tapes, laid scrims, woven fabrics or knitted fabrics, it is also possible to use an unordered laid-fiber product, for example taking the form of mats or nonwoven fabrics, or else chopped fibers of different fiber length, in particular of length from 0.1 mm to a plurality of cm, preferably of length up to 5 cm.

However, it is preferable that these fiber materials are used only during the use of the polymerizable composition of the invention for the production of the fiber-reinforced composite materials of the invention.

In a preferred embodiment, the polymerizable composition of the invention can comprise one or more other additional substances. Examples of additional substances that can be used are stabilizers, for example copper salts, dies, antistatic agents, release agents, antioxidants, light stabilizers, PVC stabilizers, lubricants, release agents, blowing agents, and combinations thereof. The preferred quantity of these additional substances is from 0 to 5% by weight, preferably from 0 to 4% by weight, particularly preferably from 0 to 3.5% by weight, based on the total weight of the polymerizable composition. If flame retardants or impact modifiers are used as additional substances, from 0 to 45% by weight of these additional substances can be used, based on the total weight of the polymerizable composition.

The polymerizable composition can comprise at least one additional substance, the quantity of which is preferably at least 0.01% by weight, based on the total weight of the polymerizable composition, particularly preferably at least 0.1% by weight, based on the total weight of the polymerizable composition, in particular at least 0.5% by weight, based on the total weight of the polymerizable composition.

It is preferable that the composition polymerizable in the invention comprises, as additional substance, at least one impact modifier. If a polymeric compound is used as impact modifier, this is regarded as belonging to the group of the abovementioned polymers. In particular, a polydiene (e.g. polybutadiene, polyisoprene) is used as impact modifier. These materials preferably comprise anhydride groups and/or epoxy groups. The glass transition temperature of the polydiene is in particular below 0° C., preferably below −10° C., particularly preferably below −20° C. The polydiene can be based on a polydiene copolymer with polyacrylates, with polyethylene acrylates and/or with polysiloxanes, and can be produced by the familiar processes (e.g., emulsion polymerization, suspension polymerization, solution polymerization, gas-phase polymerization).

Production of the Polymerizable Composition

The invention moreover provides a process for the production of the polymerizable composition, characterized in that a cyclic amide of component a) is brought into contact with at least one blocked polyisocyanate of component b) and at least one catalyst of component c).

It is preferable to provide the polymerizable composition by first mixing components b) and c) mutually independently in a), and then mixing these individual mixtures with one another.

The mixing procedure here can use the solid form of the respective individual components a) and b), and also of a) and c), or the liquid form.

It is preferable that the previously prepared separate mixtures are mixed in liquid form, with preference at a temperature of from 70 to 120° C. The temperature selected for the transfer of the liquid mixing phase of components a), b) and c) is preferably equal to or above the melting point of the resultant mixture, in particular from 70 to 120° C.

The components can be mixed batchwise or continuously. Suitable devices for the mixing of the components are known to the person skilled in the art. The batchwise mixing preferably uses stirred tanks or kneaders. Continuous mixing procedures preferably take place in an extruder or in an injection-molding machine, or else through static mixing elements present in a mixing head or directly involved in the mold. It is preferable that the temperature of the mixing device can be controlled. The components can by way of example be mixed continuously in an extruder.

The temperature of the combined mixture of components a), b) and c) is preferably above the melting point of this mixture by at most 50° C., particularly by at most 30° C., in particular by at most 20° C., specifically at most 10° C.

The form in which the individual components of the activators are used, and also that in which the catalysts are used, can also be that of ready-to-use commercially available products.

A possible activator mixture of component b) is a caprolactam-blocked hexamethylene diisocyanate in caprolactam, for example obtainable commercially as Brüggolen® C20 from Brüggemann or as Addonyl® 8120 from Rhein Chemie Rheinau GmbH. Bilaterally caprolactam-blocked isophorone diisocyanate (IPDI) is by way of example obtainable as Crelan® VP LS 2256 from Covestro AG.

A solution of sodium caprolactamate in caprolactam can be used as catalyst, an example being Brüggolen© C10 from Brüggemann, which comprises from 17 to 19% by weight of sodium caprolactamate in caprolactam or Addonyl KAT NL from Rhein Chemie Rheinau GmbH, which comprises 18.5% by weight of sodium caprolactamate in caprolactam. A suitable catalyst c) is in particular magnesium bromide caprolactamate, an example being Brüggolen® C1 from Brüggemann.

The polymerizable composition is generally handled in the liquid state in the vicinity of the polymerization temperature, and therefore has high reactivity; it is therefore advisable to achieve rapid contact with the fiber reinforcement.

The period from formation of the combined mixture of components a), b) and c) until hardening is preferably at most 10 minutes, with preference at most 5 minutes, in particular at most 1 minute.

The period from formation of the combined mixture of components a), b) and c) until hardening is preferably from 5 seconds to 10 minutes, with preference from 10 seconds to 5 minutes.

Production of a Fiber Composite Material

The invention moreover provides a process for the production of a fiber composite material, characterized in that
  i) the polymerizable composition of the invention or individual components a), b) and c) thereof is/are brought into contact with fibers and
  ii) the resultant composition is treated at a temperature of from 120 to 300° C., preferably at from 120 to 250° C., in particular at from 140 to 180° C.

The fibers here can be brought into contact with the polymerizable composition in various ways.
  1) By inserting fibers, in particular textile reinforcement structures, into a heated pressure-tight mold, the temperature of which is preferably from 120 to 170° C., and using increased pressure to force the polymerizable composition into the mold, whereupon the fiber is preferably infiltrated and then, optionally at an elevated temperature, preferably at from 120 to 300° C., the polymerizable composition polymerizes.
  2) By applying a vacuum at the pressure-tight mold and sucking the polymerizable composition of the invention into the mold, while the setup is in other respects the same as in 1.
  3) By using a combination of increased pressure and reduced pressure as in 1 and 2 to transfer the polymerizable composition into the mold.
  4) Production takes place in an extruder, the ingoing streams of which comprise fibers, in particular short fibers, and the polymerizable composition, where the extruder is operated at a temperature above the melting point of the polymer resulting from the polymerizable composition, in particular PA6.
  5) Production takes place in an extruder, the ingoing streams of which comprise one or more individual components of the polymerizable composition of the invention in solid or liquid form, and fibers.
  6) Production takes place via a traditional centrifugal casting process, where the polymerizable composition of the invention or individual components a), b) and c) thereof in solid or liquid form is/are introduced and reinforced with fibers, preferably in the form of short fibers or in the form of textile reinforcement structures.
  7) Production takes place continuously via saturation of fibers, in particular of woven fabrics, where, after application of the polymerizable composition of the invention in liquid form, the mixture is polymerized at a temperature of from 120 to 300° C., thus producing composite sheets, organopanels, profiles or pipes made of continuous-fiber-reinforced polyamides.

Preference is given to alternative 1, 2 or 3, where fibers, in particular textile reinforcement structures, are inserted into a heatable, pressure-tight mold. The polymerizable composition is then injected into the mold by means of a gauge pressure of from 1 to 150 bar and/or while a reduced pressure of from 10 to 900 mbar prevails in the mold.

Once the mold has been completely filled by the polymerizable composition of the invention, the polymerization reaction takes place at temperatures of from 120 to 250° C., preferably at from 140 to 180° C. The composite component is produced directly in the mold.

Preference is equally given to the above procedure where, in a different use of the pressure-tight mold, a reduced pressure, preferably of from 5 to 800 mbar, is applied and the polymerizable composition is sucked into the mold and after the polymerizable composition has been charged to the mold the temperature is increased for the polymerization reaction, preferably to a temperature of from 120 to 250° C.

It is also possible to combine reduced pressure and increased pressure in order to charge the polymerizable composition to the mold.

It is moreover advantageous to carry out the polymerization reaction in a traditional centrifugal casting process where the polymerizable composition is introduced in solid or liquid form into the mold and the fibers are introduced in the form of short fibers or in the form of previously laid-up textile reinforcement materials.

During the production of the composition polymerizable in the invention, and also during the inventive production of the fiber-reinforced composite materials, it can be advantageous to minimize the proportion of components not involved in the production of the polymerizable composition or of the fiber-reinforced composite material. Among these are specifically water, carbon dioxide and/or oxygen. In a specific embodiment, therefore, the components and apparatuses used are in essence free from water, carbon dioxide and/or oxygen. One possibility is, before the melt is injected, application of vacuum to the closed mold cavity used. A further additional option is the use of inert gas, for example nitrogen or argon. The polymerizable composition used, and also the fillers or reinforcement materials (fibers, for example textile sheets) can be stored in an inert gas atmosphere or blanketed therewith.

Fibers

Fibers preferably used in the process of the invention are short fibers, long fibers, continuous-filament fibers and mixtures thereof.

For the purposes of the invention, the length of "short fibers" is from 0.1 to 1 mm, the length of "long fibers" is from 1 to 50 mm, and the length of "continuous-filament fibers" is more than 50 mm. The form in which continuous-filament fibers are used for the production of the fiber-reinforced composite materials is preferably that of a textile structure, e.g. in the form of woven fabrics, knitted fabrics, laid scrims or nonwoven fabrics. Components with stretched continuous-filament fibers generally achieve very high stiffness values and strength values.

Fiber material used is preferably one made of parallel-arranged continuous yarns or continuous wovens, where these have been further processed to give textile sheets such as laid scrims, tapes, braided fabrics and woven fabrics and the like.

When the abovementioned textile fiber structures are used for component production, they can be single- or multiple-ply materials, and can also be in various combinations in respect of textile sheets, fiber types and fiber quantities therein. Preference is given to laid scrims, multiaxial laid scrims, (multiaxial) braided fabrics or woven fabrics, where these consist of two or more plies, preferably from 2 to 6 plies.

Fibers present in the fiber materials used are preferably those made of inorganic materials, for example carbon, for example in the form of low-modulus carbon fibers or high-modulus carbon fibers, silicatic and non-silicatic gasses of a very wide variety of types, boron, silicon carbide, metals, metal alloys, metal oxides, metal nitrides, metal carbides and silicates, or else organic materials, for example natural and synthetic polymers, for example polyacrylonitriles, polyesters, polyamides, polyimides, aramids, liquid-crystal polymers, polyphenylene sulfides, polyetherketones, polyetheretherketones, polyetherimides, cotton, cellulose and other natural fibers, for example flax, sisal, kenaf, hemp, abaca. Preference is given to high-melting-point materials, for example glasses, carbon, aramids, liquid-crystal polymers, polyphenylene sulfides, polyetherketones, polyetheretherketones and polyetherimides, particular preference being given to glass fibers, carbon fibers, aramid fibers, steel fibers, potassium titanate fibers, ceramic fibers and/or other sufficiently heat-resistance polymeric fibers or filaments.

The quantity of fibers that can be used is from 5 to 85% by volume, based on the resultant fiber composite material, and correspondingly by way of example when glass fibers are used from 10 to 80% by weight, the preferred quantity however being from 45 to 65% by volume, based on the fiber composite material, particularly preferred fibers here being glass fibers or carbon fibers.

The process of the invention permits very good impregnation of the reinforcement fibers with economically acceptable polymerization times and formation of products with good mechanical properties.

With the aid of the process of the invention it is possible to produce fiber-reinforced composite materials with high fiber content and, if present, filler content.

Particular preference is given to the process of the invention when the polymerizable composition or individual components a), b) and c) thereof is/are brought into contact with from 5 to 65% by volume of fibers, in particular glass fibers, based on the resultant fiber composite material, the preferred quantity being from 45 to 65% by volume.

Particular preference is given to the process of the invention for the production of a fiber composite material with fiber content, in particular glass fiber content, of from 45 to 65% by volume, where a residual content of monomeric amide a) of at most 0.3% by weight, particularly preferably at most 0.25% by weight, based on the fiber composite material, is achieved.

EXAMPLES 200 g of ε-caprolactam and the quantity stated in table 1 of catalyst, sodium caprolactamate, CAS No. 2123-24-2 (18.5% by weight in caprolactam; in the form of Addonyl Kat NL (Rhein Chemie Rheinau GmbH)) were weighed into a three-necked flask.

200 g of ε-caprolactam and the quantities likewise specified in table 1 of Addonyl 8120 were charged to a second three-necked flask.

Addonyl 8120 is a bilaterally caprolactam-blocked hexamethylene diisocyanate, specifically N,N'-hexane-1,6-diyl-bis(hexahydro-2-oxo-1H-azepine-1-carboxamide), CAS No.: 5888-87-9.

The contents of the two flasks were melted in oil baths preheated to 135° C. The flasks were then evacuated for 10 minutes at that temperature. Nitrogen was then charged to the two flasks, and the oil baths were removed.

The melts were cooled until the temperature of the melts was 100° C.

Laid glass-fiber scrims were inserted into a pressure-tight mold (sheet mold) controlled in advance to a temperature of 150° C. and flushed with $N_2$, and vacuum was then applied to the cavity.

In the next step, the contents of the feed container were transferred into the cavity of the sheet mold by applying an increased pressure of $N_2$, and polymerization was carried out to completion in said mold.

Fiber content by volume was constant in all of the composite sheets produced, being about 50% by volume.

The residual monomer contents of the fiber composite material were determined via extraction; the composite sheets were then directly sawn into test samples measuring 2×20×60 mm and sealed into airtight packs and dispatched to Polymer Service GmbH in Merseburg for determination of flexural strengths in accordance with DIN EN 2562.

TABLE 1

Polymerization formulations used, residual monomer contents thus achieved, and flexural strengths measured in accordance with DIN EN 2562; removal of sheet from mold after 4 minutes (quantities in grams)

|  | Fiber* | Addonyl 8120 % by wt. | Kat NL % by wt. | Catalyst, pure % by wt. | RMC in % | Flexural strength (longitudinal) in MPa |
|---|---|---|---|---|---|---|
| CE1 | A | 1 | 4 | 0.74 | 0.62 | 933 |
| CE2 | A | 1 | 6 | 1.10 | 0.47 | 1075 |
| CE3 | A | 1.5 | 6 | 1.10 | 0.71 | 1017 |
| CE4 | A | 1.69 | 3.21 | 0.59 | 0.78 | 900 |
| CE5 | A | 2.0 | 3.0 | 0.56 | 0.99 | 1110 |
| CE6 | A | 2.0 | 5.0 | 0.93 | 0.37 | 1123 |
| CE7 | A | 2.0 | 6.0 | 1.10 | 0.59 | 1008 |
| CE8 | A | 2.5 | 6.0 | 1.10 | 0.40 | 948 |
| CE9 | A | 2.5 | 7.0 | 1.30 | 0.28 | 1050 |
| CE10 | A | 3.0 | 6.0 | 1.10 | 0.53 | 950 |
| Inv1 | A | 3.0 | 7.0 | 1.30 | 0.22 | 1337 |
| CE11 | A | 4.0 | 7.0 | 1.30 | 0.40 | 1110 |
| CE12 | A | 3.0 | 8.0 | 1.48 | 0.53 | 1010 |
| CE13 | A | 4.0 | 8.0 | 1.48 | 0.71 | 1007 |

Abbreviations:
CE: Comparative example
Inv: Inventive
RMC: Residual monomer content
*Reinforcement A: Four plies of a laid glass-fiber roving scrim from Johns Manville (JM871). This involves a fiber with a commercially available non-reactive size appropriate for polyamide. in each case, 4 plies of the laid scrim were inserted into the cavity of the sheet mold.

What is claimed is:

1. A polymerizable composition comprising:
   a) from 95.5 to 95.9% by weight, based on the combined weight of components a), b) and c), of at least one cyclic amide, wherein the cyclic amide is laurolactam, caprolactam, or a mixture thereof,
   b) from 2.9 to 3.1% by weight, based on the combined weight of components a), b) and c), of at least one blocked aliphatic polyisocyanate, and
   c) from 1.2 to 1.4% by weight, based on the combined weight of components a), b) and c), of at least one catalyst for the polymerization of the cyclic amide,
   wherein components a), b) and c) combined make up from 50 to 100% by weight based on the total weight of the polymerizable composition.

2. The polymerizable composition as claimed in claim 1, wherein component b) comprises at least hexamethylene diisocyanate (HDI) as blocked aliphatic polyisocyanate.

3. The polymerizable composition as claimed in claim 1, wherein the at least one catalyst c) is selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium hydroxide, potassium methanolate, potassium ethanolate, potassium propanolate, and potassium butanolate.

4. A process for the production of the polymerizable composition as claimed in claim 1, the process comprising contacting the cyclic amide with the at least one blocked aliphatic polyisocyanate and the at least one catalyst.

5. The polymerizable composition according to claim 1, wherein the composition further comprises up to 50% by weight of fibrous material, based on the total weight of the composition.

6. The polymerizable composition according to claim 1, wherein:
   b) the blocked aliphatic polyisocyanate comprises at least hexamethylene diisocyanate (HDI); and
   c) the at least one catalyst is selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium hydroxide, potassium methanolate, potassium ethanolate, potassium propanolate, and potassium butanolate.

7. The polymerizable composition according to claim 6, wherein the at least one catalyst is selected from the group consisting of sodium hydride, sodium, and sodium caprolactamate.

8. A process for the production of a fiber composite material, the process comprising:
   ia) contacting the polymerizable composition as claimed in claim 1, with fibers to produce a fibered composition, or
   ib) contacting at least one of the individual components a), b) and c) of the polymerizable composition of claim 1 with fibers, followed by contacting the remaining components of the polymerizable composition of claim 1 with one another to produce a fibered composition; and
   ii) polymerizing the resultant fibered composition at a temperature of 120 to 300° C. to produce a fiber composite material,
   wherein the residual content of monomeric amide a) in the fiber composite material is at most 0.3% by weight, based on the fiber composite material.

9. The process as claimed in claim 8, wherein the polymerizable composition or the individual components a), b) and c) thereof is/are brought into contact with from 5 to 65% by volume of the fibers, based on the fiber composite material.

10. The process as claimed in claim 8, wherein the fibers comprise glass fibers.

11. A fiber composite material obtained by the process of claim 8.

12. The process as claimed in claim 8, wherein:
   the polymerizable composition or the individual components a), b) and c) thereof is/are brought into contact with 45 to 65% by volume of the fibers, based on the fiber composite material;
   the fibers comprise glass fibers;
   the fibers do not comprise reactive size;
   the fibered composition is polymerized at a temperature of 140 to 180° C.; and
   the residual content of monomeric amide a) in the fiber composite material is at most 0.25% by weight, based on the fiber composite material.

13. A fiber composite material obtained by the process of claim 12.

* * * * *